(12) United States Patent
Frazier et al.

(10) Patent No.: US 6,598,949 B2
(45) Date of Patent: Jul. 29, 2003

(54) DATA TRANSMISSION PEDESTAL WITH TWO PIECE BASE

(75) Inventors: Gerald Frazier, Pearl, MS (US); Jerome A. Maloney, Batavia, IL (US); Lawrence Dolan, Carol Stream, IL (US); Matthew Leschinger, Wheaton, IL (US)

(73) Assignee: Marconi Communications, Inc., Cleveland, OH (US)

( * ) Notice: Subject to any disclaimer, the term of this patent is extended or adjusted under 35 U.S.C. 154(b) by 21 days.

(21) Appl. No.: 09/827,678

(22) Filed: Apr. 6, 2001

(65) Prior Publication Data

US 2002/0145367 A1 Oct. 10, 2002

(51) Int. Cl.[7] .................................................. H02G 9/00
(52) U.S. Cl. ........................ 312/263; 312/223.6; 174/38
(58) Field of Search ............................. 312/263, 265.5, 312/223.6; 220/4.02, 4.21, 4.26, 3.8, 475; 174/37, 38, 39, 58, 59, 60

(56) References Cited

U.S. PATENT DOCUMENTS

| 3,864,510 A | * | 2/1975 | Ramsey et al. | ............... 174/38 |
|---|---|---|---|---|
| 4,058,670 A | * | 11/1977 | Leschinger | ................... 174/38 |
| 4,183,601 A | * | 1/1980 | Barber et al. | .................. 174/38 |
| 5,210,374 A | * | 5/1993 | Channell | ..................... 174/38 |
| 5,308,923 A | * | 5/1994 | Puigcerver et al. | ........... 174/43 |
| 5,384,427 A | * | 1/1995 | Volk et al. | ..................... 174/38 |
| 5,715,761 A | * | 2/1998 | Frattini | ..................... 312/223.6 |
| 6,182,846 B1 | * | 2/2001 | Leschinger et al. | ........ 220/4.02 |
| 6,198,041 B1 | * | 3/2001 | Leschinger et al. | ........... 174/38 |
| 6,244,635 B1 | * | 6/2001 | Leschinger et al. | ......... 220/326 |
| 6,316,722 B1 | * | 11/2001 | Low et al. | ..................... 174/38 |

FOREIGN PATENT DOCUMENTS

| GB | 2264394 | * | 8/1993 | ................... 174/59 |
|---|---|---|---|---|
| JP | 54007595 | * | 1/1979 | ................... 174/38 |

* cited by examiner

Primary Examiner—Lanna Mai
Assistant Examiner—Hanh V. Tran
(74) Attorney, Agent, or Firm—Jones Day

(57) ABSTRACT

A flexible and economical data transmission pedestal having a cover section and a base section, with the base section comprising two asymmetrical parts, a front and a rear. Removing the cover and the front part allows full access to the connections between service lines and a cable. The three piece pedestal also allows any piece to be easily replaced if damaged or a whole new pedestal may easily be placed around cable and service line connections on a mounting plate, all without interrupting customer service.

6 Claims, 2 Drawing Sheets

DATA TRANSMISSION PEDESTAL WITH TWO PIECE BASE

BACKGROUND OF THE INVENTION

1. Field of the Invention

The present invention relates to a data transmission pedestal with a two piece base section and more particularly to a flexible and economic pedestal with an asymmetrical two part base section to allow easier and better access to a cable and lines within the pedestal.

2. Description of the Related Art

Data transmission lines connect central distribution offices to customer locations usually through buried underground cable. In close vicinity to a customer's location, the data transmission cable is brought above ground where preselected lines in the cable are connected to an underground service line from a customer which is also brought above ground. The appropriate cable lines and services lines are connected by use of terminal blocks mounted to grounded frames. These above-ground connections are covered by a pedestal to protect the connections from weather and other environmental factors, as well as from tampering and vandalism. The pedestal may be opened to facilitate service of the lines and the cable when such service is needed.

Pedestals have been used in the past and typically a pedestal includes a cover section, a base section, a mounting plate and a grounding bracket. See for example, U.S. Pat. Nos. 6,198,041, 6,244,635 and 6,182,846.

Two piece bases for pedestals have been used in the past, such as one marketed by Charles Industries, Ltd. of Rolling Meadows, Ill., called a CPLM Magnum R-Base. This base, however, is just a cylindrical tube which has been split in half longitudinally.

BRIEF SUMMARY OF THE INVENTION

What is described here is a data transmission pedestal comprising a housing having a cover section and a base section for enclosing a data transmission cable, service lines and connections therebetween, the base section having asymmetrical front and rear parts, the front and the rear parts being removably attached to one another, and a service passage being connected to the front part of the base section for receiving service lines emanating from customer locations.

There are a number of advantages, features and objects achieved with the present invention which are believed not to be available in earlier related devices. For example, one advantage is that the data transmission pedestal with an asymmetrical two piece base section provides easier and better access, 360° access, to cable and lines within the pedestal. Another feature is that the present invention allows for the easy and quick exchange of pedestal parts or connection of wire without disconnecting service lines from the cable or even disturbing the mounting plate on which the connections are made. A further feature is that a new pedestal may easily be added to cover an existing cable should there be damage to the existing pedestal due to weather or accident. Still another object of the present invention is to provide a data transmission pedestal with a two piece base section which is simple, flexible and economical.

A more complete understanding of the present invention and other objects, advantages and features thereof will be gained from a consideration of the following description of the preferred embodiment read in conjunction with the accompanying drawing provided herein.

DETAILED DESCRIPTION OF THE INVENTION

Figure 1:
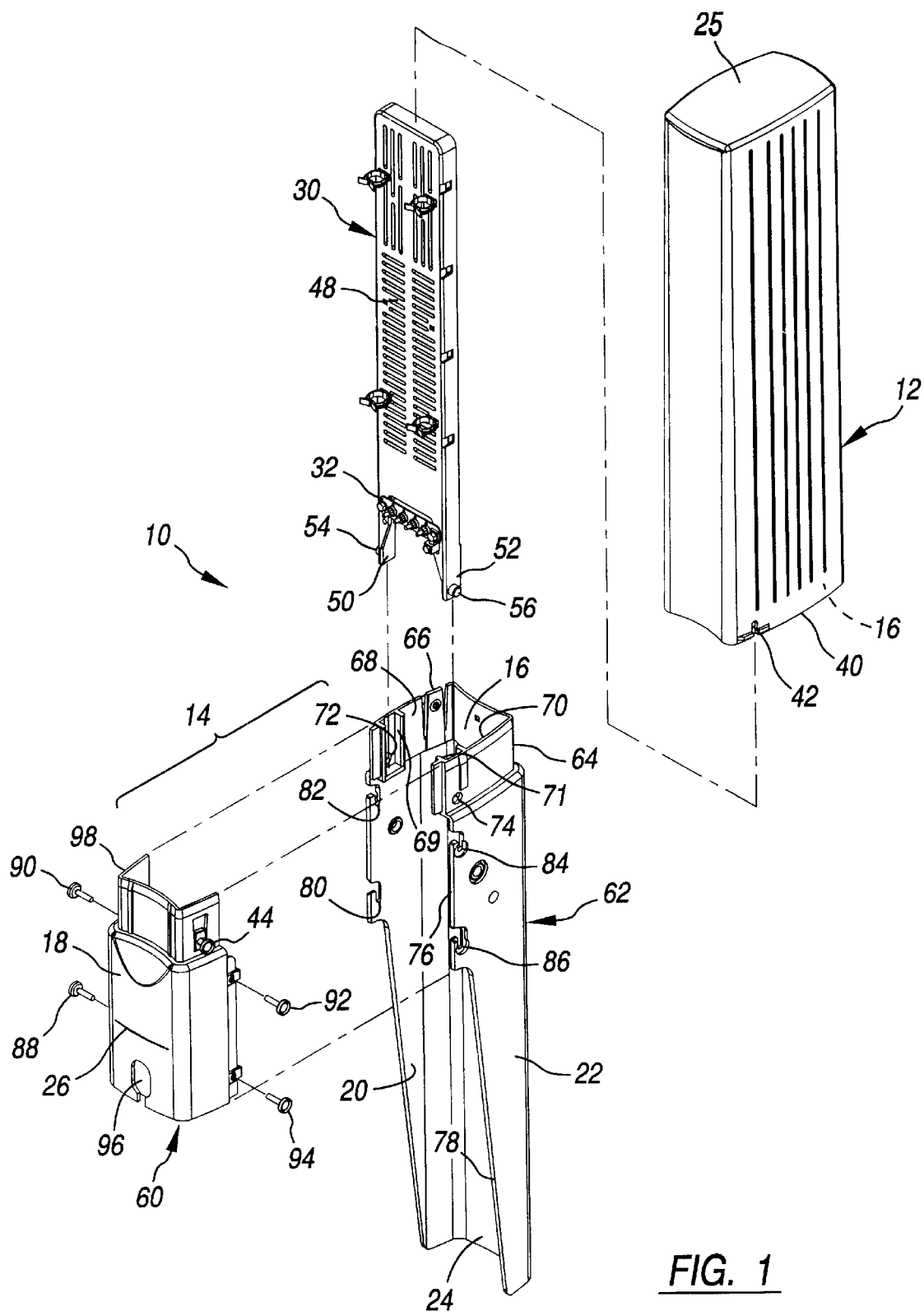
FIG. 1 is an exploded front isometric view of a data transmission pedestal of the present invention.
Figure 2:
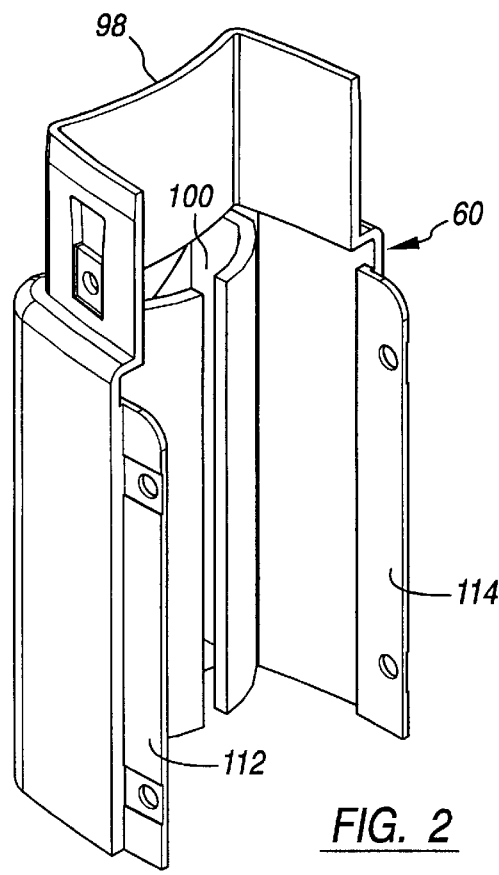
FIG. 2 is an enlarged rear isometric view of the front part of the base section.

While the present invention is open to various modifications and alternative constructions, the preferred embodiment shown in the drawing will be described herein in detail. It is understood, however, that there is no intention to limit the invention to the particular form disclosed. On the contrary, the intention is to cover all modifications, equivalent structures and methods, and alternative constructions falling within the spirit and scope of the invention as expressed in the appended claims.

Referring now to FIG. 1, a data transmission pedestal assembly is designated generally by the reference numeral 10. The pedestal is in the form of an elongated housing including a cover section 12 and a base section 14. An interior chamber 16 is formed within the cover and the base and is defined by a front wall 18, a left side wall 20, a right side wall 22, a rear wall 24 and a top wall 25. In use, the pedestal is installed with much of the base section buried or recessed into the ground. A bead 26 on the front wall indicates where ground level will be in relation to the pedestal.

The purpose of the pedestal is to protect an underground cable when it is brought above ground to connect to service lines from customer locations. Within the pedestal are terminal blocks, as well as other data transmission equipment which are connected to a mounting plate 30. The mounting plate includes a conductive metal ground bracket 32 and the plate is connected to the base section as will be explained. The mounting plate, the terminal blocks and the connected lines are disposed within the pedestal chamber and are protected from weather, contaminates, tampering and vandalism.

Figure 3:
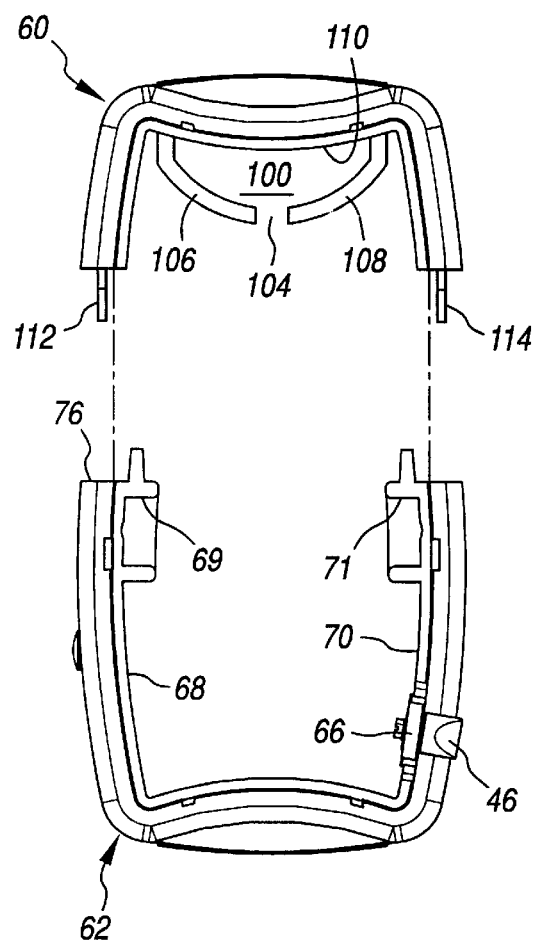
FIG. 3 is a top plan view of the base section with separated front and rear parts.
Figure 4:
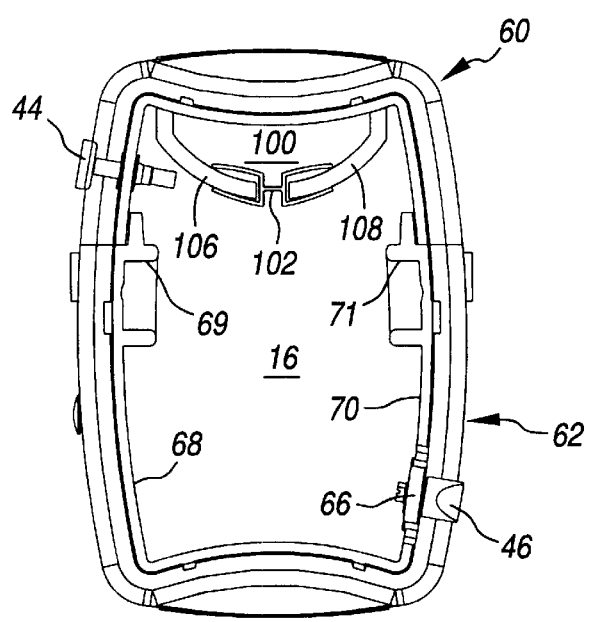
FIG. 4 is a top plan view of the base section with connected front and rear parts.

The cover section 12 includes the above mentioned four vertical walls and the top wall and is adapted to engage the base section in use. A bottom edge 40 of the cover includes a slot 42 to receive a tamper resistant fastener 44 connected to the base. The cover also includes a hole (not shown) for receiving a projection 46, FIGS. 3 and 4. The projection and fastener lock the cover to the base when in the field. Within the chamber 16 is the mounting plate 30. The mounting plate includes a mounting board 48 to which terminal blocks (not shown) are connected and two attachment legs 50, 52 which engage the base. Each leg is flexible and each includes a cylindrical projection 54, 56.

The base section 14 is divided into two parts, a front part 60 and a rear part 62. These parts are asymmetrical and perform different functions. The rear part has a reduced dimensioned upper portion 64 allowing it to be received by the cover in a telescoping manner. The upper portion 64 includes a flexible tab 66 to which is attached the projection 46. Integral with inner walls 68, 70 of the rear part 62 are channel shaped connectors 69, 71 and two oppositely placed holes 72, 74. The channels and holes receive the legs of the mounting plate. The legs 50, 52 are cammed inwardly as the mounting plate is installed on the rear part of the base. When the legs are completely installed, they will automatically flex outwardly thereby placing the projections 54, 56 in the holes 72, 74, respectively. The rear part of the base includes a front edge 76 and a scoop edge 78. The scoop edge facilitates installment of the base in the ground. The front edge has four bent slots 80, 82, 84, 86 for receiving four tamper proof fasteners 88, 90, 92, 94. The fasteners fit within the slots and the fasteners 90, 92 are then tightened to lock the front and the rear parts together. The fasteners 88 and 94 are fixed. The scoop-shaped edge extends the longitudinal length of the rear part 62 to roughly three times the length of the front part 60.

The front part 60, FIGS. 1–4, of the base section 14 is relatively short and includes a slot 96 for receiving service lines to be connected to a cable. Connected at an upper portion 98 of the front part is the tamper proof fastener 44. As explained above, the fastener is received by the slot 42 of the cover section 12. The upper portion 98 of the front part, like the upper portion 64 of the rear part 62 of the base has smaller dimensions so as to be telescoped into the cover. The front part 60 includes a service line passage 100 for receiving and restraining service lines as they pass from underground to the terminal blocks mounted to the mounting plate 30. A slidable closure 102 may be used to block a gap 104 formed between extending arcuate arms 106, 108 which define the passage along with an interior wall 110 of the front part 60. The front part also includes extending flanges 112, 114 to which the fasteners 88, 90, 92, 94 are connected.

In operation, the front and rear parts 60, 62 of the base section 14 are attached together, the mounting plate is attached to the rear part 62 of the base section and the cover section covers the mounting plate and the upper portions of the front and rear parts. However, if a part of the pedestal is damaged, it may be removed and replaced with ease. Also, these same parts may be easily added to a cable-service line connection if a whole new pedestal is required. Finally, if new service lines are to be added to an existing pedestal, the cover section and the front part may be removed to allow full 360° access to the chamber 16 where the lines are located. Because of the service line passage, the lines may be disengaged from the front part simply by removing the slidable closure 102 and passing the lines through the gap 104. If the cover section and the front part of the base section are removed for access to the lines, it is to be noted that the mounting plate remains in position connected to the rear part of the base section which is still mostly buried in the ground. Therefore, full access is provided while the mounting plate remains secure. There is no need for a second set of hands to hold the mounting plate nor is there the fear that moving the mounting plate might dislodge any of the line connections. The pedestal described is flexible and economical and is easy to handle in the field.

The specification describes in detail an embodiment of the present invention. Other modifications and variations will, under the doctrine of equivalents, come within the scope of the appended claims. For example, the exact shape of the scoop-shaped bottom edge, of the service line channel, and of the mounting plate may be modified without departing from the invention. Any such modifications are considered to be equivalent structures. Also, changes to the manner of connection between the front and rear parts of the base section may be made without departing from the invention here. Still, other alternatives will also be equivalent as will many new technologies. There is no desire or intention here to limit in any way the application of the doctrine of equivalents.

What is claimed is:

1. A data transmission pedestal comprising:

a housing having a cover section, a base section and an interior chamber, said cover section detachably connected to said base section, said base section having a front part and a rear part, said front and rear parts being removably connected to one another;

a mounting plate removably connected to said rear part of said base section, said mounting plate for supporting electrical connections and being covered by said cover section, a service passage formed in said interior chamber by an interior wall of said front part and two wall-like arms which extend from said interior wall of said front part forming a gap therebetween, wherein service lines in said interior chamber are fully movable into said service passage and service lines in said service passage are fully movable into said interior chamber without separating said front part from said rear part of said base section and a closure having oppositely disposed structures for engaging the length of said wall-like arms for closing said gap.

2. The pedestal as claimed in claim 1 wherein:

said closure is engaged to said wall-like arms by sliding said closure the length of said wall-like arms.

3. The pedestal as claimed in claim 1 wherein:

removal of said cover section provides three hundred and sixty degrees of access to said mounting plate; and removal of said front part of said base requires little earth removal.

4. The pedestal as claimed in claim 1 including:

an opening in a front wall of said front part of said base section for facilitating access from outside said pedestal to said service passage.

5. The pedestal as claimed in claim 1 wherein:

said mounting plate includes flexible mounting legs.

6. The pedestal as claimed in claim 1 wherein:

said cover section, said front part and said rear part are individually or all replaceable without disconnecting any electrical lines connected to said mounting plate.

* * * * *